United States Patent [19]

Leshem

[11] Patent Number: 5,388,008
[45] Date of Patent: Feb. 7, 1995

[54] DEVICE FOR RECORDING AND PLAYING BACK INFORMATION SIGNALS

[75] Inventor: Pawel Leshem, Biedermannsdorf, Austria

[73] Assignee: U.S. Philips Corporation, New York, N.Y.

[21] Appl. No.: 925,354

[22] Filed: Aug. 4, 1992

[30] Foreign Application Priority Data

Aug. 7, 1991 [AT] Austria .................. 1566/91

[51] Int. Cl.⁶ .................. G11B 5/86; G11B 27/02; H04N 5/76
[52] U.S. Cl. .................. 360/15; 360/13; 358/335
[58] Field of Search .................. 360/15–16, 360/13, 27; 369/84, 54

[56] References Cited

U.S. PATENT DOCUMENTS

| 4,167,026 | 9/1979 | Sambe et al. | 360/15 |
| 4,628,370 | 12/1986 | Fukuoka | 360/15 |
| 5,097,461 | 3/1992 | Majima | 360/15 |

FOREIGN PATENT DOCUMENTS

| 0087349 | 3/1990 | Japan | 360/15 |
| 2252194 | 7/1992 | United Kingdom | 360/15 |

OTHER PUBLICATIONS

Translation of Japanese Document, JA 02-87349, Miyamoto.

Primary Examiner—Andrew L. Sniezek
Assistant Examiner—Jennifer Pearson
Attorney, Agent, or Firm—Richard A. Weiss

[57] ABSTRACT

A device (1) for recording and playing back information signals has a connection apparatus (17) via which another such device (35) can be connected to the device (1) in order to carry out a copy operation. The other device (35) emits a control voltage U1 when a high level H with the "playback" mode of operation is switched on in the same. A copy instruction can be intentionally issued to the device (1) for example by actuating a key (46). The device (1) has a first detector (49) for detecting the control voltage U1 with a high level H emitted by the other device (35) and a second detector (50) for detecting an intentionally issued copy instruction. The "record" mode of operation is only switched on in the device (1) in order to carry out a copy operation in the event of both detectors (49, 50) being triggered simultaneously.

7 Claims, 2 Drawing Sheets

DEVICE FOR RECORDING AND PLAYING BACK INFORMATION SIGNALS

BACKGROUND OF THE INVENTION

1. Field of the Invention

The invention relates to a device for recording and playing back information signals on a record carrier. The device includes a control apparatus for controlling modes of operation of the device, with which control apparatus at least one "record" mode of operation and one "playback" mode of operation can be switched on. The device also includes a connection apparatus to which another such device can be connected in order to transmit to the first device information signals which are played back by the other device when its "playback" mode of operation is switched on, so that the first device can record those information signals when its "record" mode of operation is switched on. The connection apparatus has connection contacts, some of which are provided for passing on to the first device the information signals which are played back by the other device, and others for passing on to the first device a control voltage generated by the other device, which control voltage can be switched by the other device between a first level which indicates that the "playback" mode of operation is not switched on in the other device and a second level which indicates that the "playback" mode of operation is switched on in the other device.

2. Description of Related Art

Such a device is known in many different embodiments. By way of example, such a device in the form of a videorecorder is produced by Philips Electronics with the type designation VR 6760. Another videorecorder can be connected to this known videorecorder via its connection apparatus, which is known as a Scart socket, in order to record in a copy operation image and sound signals played back by the other videorecorder when its "playback" mode of operation is switched on and the known videorecorder's "record" mode of operation is also switched on thereby allowing the known videorecorder to copy the image and sound signals. In such a copy operation, the starting point in the image and sound signals desired for copying must first be searched for by the videorecorder provided for playing back. The "playback" mode of operation must then be switched on manually and, as far as possible, at exactly the same time the "record" mode of operation is manually switched on in the videorecorder provided for recording. In this process, there is the difficulty of actually triggering these two manual switching processes at exactly the same time. If the "record" mode of operation in the videorecorder provided for recording is switched on too early in relation to the "playback" mode of operation in the videorecorder provided for playing back, then this results in a recording gap in the image and sound signals in the copy. On the other hand, if the "record" mode of operation in the videorecorder provided for recording is switched on too late in relation to the "playback" mode of operation in the videorecorder provided for playing back, then this results in the start of the image and sound signals desired for copying being absent in the copy. Both deficiencies are undesired and are felt to be a fault and disadvantage by the users of the known device.

SUMMARY OF THE INVENTION

An object of the invention is to eliminate the previously mentioned difficulties in a device of the generic type described above, and to provide an improved device with which it is reliably ensured, using simple means, that in the event a copy of specific information signals is desired by a user, the "record" mode of operation is switched on in a device (i.e. the first device) with which the information signals to be copied are to be recorded exactly at the same time as the "playback" mode of operation is switched on in another device which is connected to the first device and with which the information signals to be copied are to be played back. For this purpose, the invention is characterized in that the first device has a first detector which is connected to certain contacts of its connection apparatus, with which first detector the level of the control voltage fed to the first device from the other device via certain of its connection contacts can be detected. The first detector generates a first item of control information when the second level of the control voltage is detected. The first device also has a second detector with which it is possible to detect whether the first device has been given a copy instruction in order to record in a copy operation information signals played back by the other device when in its "playback" mode of operation. The second detector generates a second item of control information when a copy instruction is detected. The control apparatus of the invention is designed to process the first item of control information and the second item of control information and to switch on the "record" mode of operation in the first device as a function of the simultaneous presence of the first item of control information and of the second item of control information.

In this way, it is ensured that only a single copy instruction has to be given for a copy operation to be prepared or enabled, and that this copy instruction also has to be actually intentionally issued in order for a copy operation to be carried out. As a result, accidental undesired copying is reliably prevented. Furthermore, in this way it is ensured with very simple means that whenever a user wishes to copy information signals supplied to a first device from another device in a copy operation, which the user intentionally indicates by supplying a detectable copy instruction to the first device, the "record" mode of operation is switched on in the first device (with which the information signals to be copied are to be recorded) exactly at the same time as the "playback" mode of operation is switched on in the other device (which is connected to the first device and with which the information signals to be copied are to be played back). The switching on of the other device is detected by the first detector by the occurrence of a high level of the control voltage emitted by the other device. As a result, both of the following are reliably avoided: a recording gap existing before the information signals copied in a copy and loss of the start of the information signals to be copied from a copy. Furthermore, in this way it is ensured that after a copy operation the "record" mode of operation of the first device is switched off exactly at the same time as the "playback" mode of operation is switched off in the other device. The switching off of the other device is detected by the first detector by the absence of a high level of the control voltage emitted by the other device. As a result, the first device (provided for recording) is switched off exactly at the end of a copy of information signals. This is advantageous because as a result of it the start of a subsequent copy can easily be joined at precisely the end of a copy without additional manipulations.

After a copy of information signals has been made, the "playback" mode of operation is switched off in the other device (provided for playing back) and, as a consequence of this, the "record" mode of operation is switched off in the first device (provided for recording), any kind of playback mode of operation such as image search, freeze frame playback or even normal playback may be switched on in the other device in order to search for further information signals which are desired for copying. This will result in the high level control voltage which indicates that a "playback" mode of operation is switched on in the other device being generated again. So as not to trigger any undesired switching on of the "record" mode of operation in the first device as a result of this control voltage, in the case of such search process in which no copying of information signals is to take place, the generation or emission of this control voltage can be suppressed during such a search process. This can be achieved, for example, by actuating a separate blocking key of the other device. Likewise, the supply of that control voltage to the first detector can be suppressed during such a search process, for example, by actuating a separate blocking key of the first device.

However, it has proven advantageous if the control apparatus is designed to switch on the "record" mode of operation again, after that mode of operation has been previously switched off, exclusively in the case of a renewed simultaneous presence of both the first item of control information and the second item of control information. As a result, it is ensured, in a particularly simple manner and without additional means, that in the case of a search process in the other device (which is provided for playing back and connected to the first device (provided for recording)), the "record" mode of operation is not undesirably switched on in the first device as a result of a high level of the control voltage generated in the other device. Instead, the "record" mode of operation for copying information signals is only ever switched on after a copy instruction is intentionally issued again and as a consequence of the renewed presence of the second item of control information.

A copy instruction can be issued to the first device (provided for recording), for example, by means of a remote control apparatus which has a separate manually actuated copying key for triggering a copy instruction. It has, however, proven advantageous with regard to a copy operation if the device has a separate manually actuated key which by being actuated permits a copy instruction to be input into the device. This has proven advantageous with respect to simple and reliable operation during a copy operation in which the two devices required for copying are usually located one next to the other.

BRIEF DESCRIPTION OF THE DRAWINGS

The invention is described in greater detail below with reference to exemplary embodiments illustrated diagrammatically in the drawings. It is, however, to be understood that the invention is not restricted to such exemplary embodiments.

DESCRIPTION OF THE PREFERRED EMBODIMENTS

Figure 1:
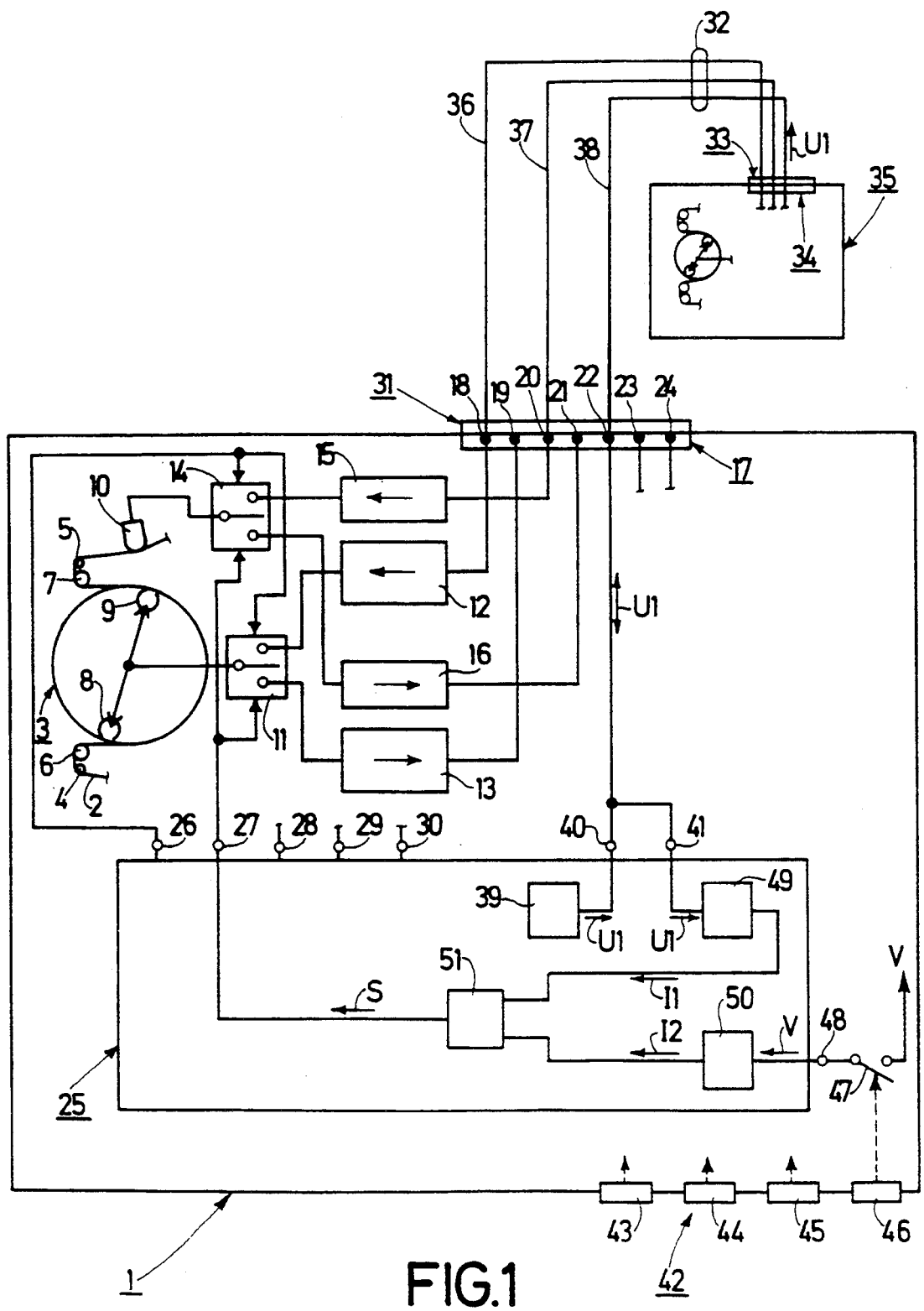
FIG. 1 shows a diagrammatic view of a videorecorder (of which only the components which are relevant to the present invention are illustrated) which has a separate copying key and a control apparatus, which comprises a microcomputer, for controlling its modes of operation.

In FIG. 1, a videorecorder 1 is illustrated. It is designed to record and play back image and sound signals on a magnetic tape 2 provided as a record carrier. For this purpose, the magnetic tape 2 is held looped around a drum-shaped sensing device 3 with the aid of pin-like and roller-like tape guides 4, 5, 6 and 7. The drum-shaped sensing device 3 has two rotating drivable magnetic heads 8 and 9 which sense the magnetic tape 2 along oblique tracks lying one next to the other and extending obliquely with respect to the longitudinal direction of the magnetic tape in order to record image signals on the magnetic tape 2 and to play back from the magnetic tape 2 image signals which have been recorded thereon. Furthermore, a stationary magnetic head 10 is in a sensing connection with the magnetic tape 2, with which magnetic head 10, sound signals can be recorded in a longitudinal track on the magnetic tape 2, the longitudinal track extending in the longitudinal direction of the magnetic tape 2, and sound signals recorded on the magnetic tape 2 can be played back from the magnetic tape 2.

A diagrammatically indicated electronic switch-over device 11 is connected to the magnetic heads 8 and 9 which can be driven in rotation. Via the switch-over device 11, the magnetic heads 8 and 9 can be connected in a "record" mode of operation to a recording image signal processing circuit 12 and in a "playback" mode of operation to a playback image signal processing circuit 13. A further diagrammatically illustrated electronic switch-over device 14 is also connected to the stationary magnetic head 10. Via switch-over device 14, the stationary magnetic head 10 can be connected in a "record" mode of operation to a recording sound signal processing circuit 15 and in a "playback" mode of operation to a playback sound signal processing circuit 16.

The videorecorder 1 has a diagrammatically indicated connection apparatus 17 which is known as a Scart socket. The socket 17 has a multiplicity of connection contacts, namely twenty-one connection contacts. Only some of these connection contacts are illustrated in FIG. 1, and they are designated with the reference numerals 18, 19, 20, 21, 22, 23 and 24.

The connection contact 18 is connected to the recording image signal processing circuit 12. Image signals which are fed to the videorecorder 1 can be fed, via this connection contact 18, to the recording image signal processing circuit 12. When the videorecorder 1 is in the "record" mode of operation, those image signals are fed, via the switch-over device 11, to the magnetic heads 8 and 9, which can be driven in rotation.

The connection contact 20 is connected to the recording sound signal processing circuit 15. Sound signals which are fed to the videorecorder 1 can be fed, via the connection contact 20, to the recording sound signal processing circuit 15. When the videorecorder 1 is in the "record" mode of operation, those sound signals are fed, via the further switch-over device 14, to the stationary magnetic head 10.

The connection contact 19 is connected to the playback image signal processing circuit 13. Image signals played back by the magnetic heads 8 and 9, which can be driven in rotation, are fed, via the switch-over device 11, to the playback image signal processing circuit 13 in the "playback" mode of operation. From the playback image signal processing circuit 13, the processed image signals are passed on to the connection contact 19 from which the processed image signals can be fed to another device, for example, a television receiver or another videorecorder.

The connection contact 21 is connected to the playback sound signal processing circuit 16. Sound signals played back with the stationary magnetic head 10 are fed, via the further switch-over device 14, to the playback sound processing circuit 16 in the "playback" mode of operation. From the playback sound processing circuit 16, the processed sound signals are passed on to the connection contact 21 from which the processed image signals can be fed to another device, for example, a television receiver or another videorecorder.

The videorecorder 1 has a diagrammatically indicated electronic control apparatus 25 with which the modes of operation of the videorecorder 1 can be controlled. The control apparatus 25 is formed using a microcomputer (not illustrated separately) together with the peripheral components required for this. Using the control apparatus 25, a "playback" mode of operation can be switched on in the videorecorder 1 by the control apparatus 25 issuing an appropriate control signal to an output 26. In addition, using the control apparatus 25, a "record" mode of operation can be switched on by the control apparatus 25 issuing an appropriate control signal to a further output 27. In the two above-mentioned modes of operation, i.e., "playback" and "record", the magnetic tape is driven in each case with a so-called normal forward run tape speed. Using the control apparatus 25 other modes of operation of the videorecorder 1 can also be switched on, for example, a "fast search" mode of operation by issuing an appropriate control signal to an output 28, a "pause" mode of operation by issuing an appropriate control signal to an output 29 or a "stop" mode of operation by issuing an appropriate control signal to a further output 30.

As can be seen from FIG. 1, the output 26 is connected to control inputs of the two switch-over devices 11 and 14. By means of the control signal issued at the output 26 of the control apparatus 25, those switch-over devices 11 and 14 can be switched into positions in which the magnetic heads 8 and 9, which can be driven in rotation, are connected to the playback image signal processing circuit 13 and the stationary magnetic head 10 is connected to the playback sound signal processing circuit 16. The output 27 of the control apparatus 25 is also connected to further control inputs of the two switch-over devices 11 and 14. By means of the control signal issued at the output 27 of the control apparatus 25, those switch-over devices 11 and 14 can be switched into positions in which the magnetic heads 8 and 9, which can be driven in rotation, are connected to the recording image signal processing circuit 12 and the stationary magnetic head 10 is connected to the recording sound signal processing circuit 15.

A diagrammatically indicated plug 31 which is connected, via a multi-conductor cable 32, to a further plug 33 can be plugged into the connection apparatus formed by the socket 17. According to the configuration illustrated in FIG. 1, the plug 33 is plugged into a connection apparatus 34, also formed by a Scart socket, of a further videorecorder 35. In FIG. 1, for the sake of simplicity, only three lines 36, 37 and 38 of the multi-conductor cable 32 are illustrated. Using the other videorecorder 35, image signals played back with the "playback" mode of operation switched on in the videorecorder 35 can be fed, via the line 36, to the connection contact 18 and from that connection contact 18 to the recorded image signal processing circuit 12. Using the other videorecorder 35, sound signals played back with the "playback" mode of operation switched on in the videorecorder 35 can be fed, via the line 37, to the connection contact 20 and from that connection contact 20 to the recording sound signal processing circuit 15.

The electronic control apparatus 25 has a stage 39 for generating a control voltage $U_1$. The control voltage $U_1$ is essentially a DC control voltage which is switched over between a low level L and a high level H by the control apparatus 25. The control voltage $U_1$ is switched to the low level L if no "playback" mode of operation is switched on in the videorecorder 1. Hence, the low level L indicates that no "playback" mode of operation is switched on in the videorecorder 1. The control voltage $U_1$ is switched over to the high level H if a "playback" mode of operation is switched on in the videorecorder 1. Hence, the high level H indicates that a "playback" mode of operation is switched on in the videorecorder 1. In accordance with an international standard, the low level L must be smaller than 2.0 volts and the high level H must be higher than 9.5 volts. The control voltage $U_1$ can be fed, via an output 40 of the control apparatus 25, to the connection contact 22 of the socket 17 and can be fed from the connection contact 22, via the line 38, to the other videorecorder 35. In this way, the other videorecorder 35 can be signalled, by means of the control voltage $U_1$, as to whether a "playback" mode of operation is switched on in the videorecorder 1 or whether this is not the case.

Analogously, although not shown in FIG. 1, the other videorecorder 35 also has a stage for generating such a control voltage $U_1$ which can be fed (in the opposite direction from that described above) from the other videorecorder 35, via the line 38, to the connection contact 22 of the videorecorder 1. The connection contact 22 of the videorecorder 1 is additionally connected to an input 41 of the control apparatus 25, via which the control voltage $U_1$ emitted by the other videorecorder 35 can be fed to the control apparatus 25.

The videorecorder 1 is provided with a set 42 of keys, which are preferably designed as jog keys, for switching on its modes of operation and for inputting data. For the sake of simplicity, only four keys of the entire key set 42 are illustrated in FIG. 1, and they are provided with the reference numerals 43, 44, 45 and 46. The keys 43, 44 and 45 can, for example, serve to switch on the "playback", "record" and "stop" modes of operation, respectively. The key 46 can be a key for activating a copy operation, and its actuation permits a copy instruction to be input into the videorecorder 1. As a result of such a copy instruction, image and sound signals which are played back by the other videorecorder 35, with its "playback" mode of operation switched on, are fed, via the cable 32, to the videorecorder 1 where they are recorded, that is to say copied, on the magnetic tape 2 by the videorecorder 1, with its "record" mode of operation switched on. The actuation of the copy key 46 also causes a switch 47 to close, whereby an input 48 of the control apparatus 25 is fed a voltage V.

The videorecorder 1 has a first detector 49 (contained in the control apparatus 25) which is connected, via the input 41 of the control apparatus 25, to the connection contact 22 and with which the level of the control voltage U1 fed by the other videorecorder 35, via the connection contact 22, to the videorecorder 1 can be detected. When a high level H of the control voltage U1 is detected, the first detector generates a first item of control information I1. In addition, the videorecorder 1 has a second detector 50 (also contained in the control apparatus 25) which is connected, via the input 48 of the control apparatus 25, to a switch 47 which can be closed by the copy key 46. The second detector 50 can be detected whether the input 48 of the control apparatus 25 is fed the voltage V, via the switch 47, i.e., whether a copy instruction has been intentionally issued to the videorecorder 1 by actuating the copy key 46 in order to record, in a copy operation using the videorecorder 1 in its "record" mode of operation, the same image and sound signals played back by the videorecorder 35 in its "playback" mode of operation. When a copy instruction is detected, i.e., when the voltage V is detected at the input 48 of the control apparatus 25, the second detector 50 generates a second item of control information I2.

The control apparatus 25 is designed to process the first item of control information I1 and the second item of control information I2. For this purpose, the control apparatus 25 contains a logic stage 51 which in the present case only issues a control signal S in the simultaneous presence of the first item of control information I1 and of the second item of control information I2. The control signal S is fed to the output 27 of the control apparatus 25 via which output the "record" mode of operation can be switched on in the videorecorder 1. Thus, the control apparatus 25 is designed to switch on the "record" mode of operation in the videorecorder 1 as a function of the simultaneous presence of the first item of control information I1 and of the second item of control information I2.

A flow diagram of a program cycle is described below with reference to FIG. 2, which program cycle is processed in the microcomputer contained in the control apparatus 25 in order to switch on the "record" mode of operation in the videorecorder 1 for a copy operation. The stage 39, the detectors 49 and 50 and the logic stage 51 are also formed utilizing this microcomputer.

Figure 2:
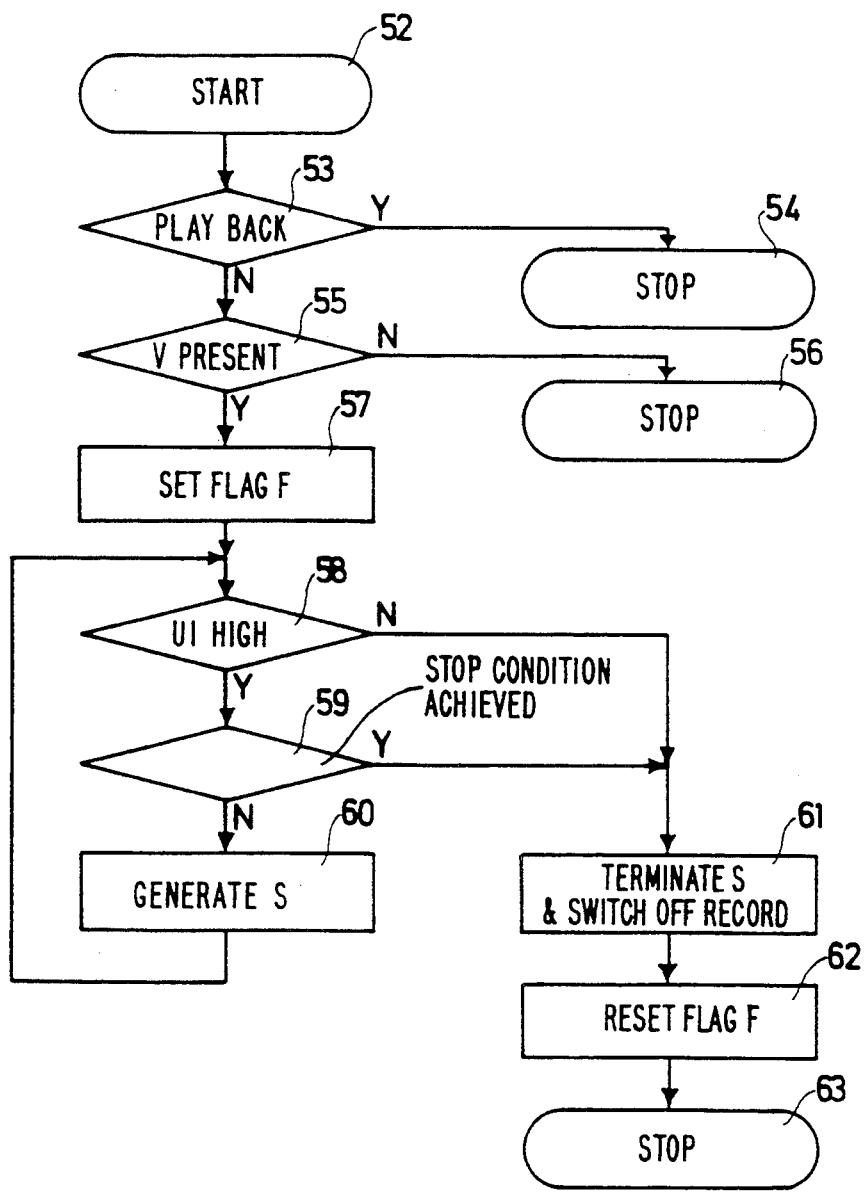
FIG. 2 is a flow diagram of a program cycle which is processed in the microcomputer of the control apparatus of the videorecorder according to FIG. 1 in order to switch on the "record" mode of operation in this videorecorder for a copy operation.

The program cycle according to the flow diagram in accordance with FIG. 2 is started at a block 52. Afterwards, at a block 53 a test is made with the control apparatus 25 as to whether a "playback" mode of operation is switched on in the videorecorder. This item of information is of course contained in the microcomputer of the control apparatus 25 itself and is, therefore, interrogated inside the microcomputer. In the case of a positive test result at the block 53, i.e., "playback" mode of operation is switched on in the videorecorder 1 and, thus, no recording, which is required for a copy operation, is possible, the present program cycle is ended at a block 54 and the processing of other program cycles is started. If, on the other hand, it is detected at the block 53 that no "playback" mode of operation is switched on in the videorecorder 1, the program cycle is continued at a block 55.

At the block 55, a test is made with the second detector 50 as to whether the voltage V is present at the input 48 of the control apparatus 25, i.e., whether the copy key 46 has been actuated. If the result of this test is negative, i.e., no intentional copy instruction has been issued, then at a block 56 the present program cycle is terminated and the system goes over to processing other program cycles. On the other hand, if the test at the block 55 produces a positive result, which constitutes the second item of control information I2, the program cycle is continued at a block 57. At the block 57, a flag F is set which corresponds to storage of the second item of control information I2.

After the flag F is set at the block 57, the program cycle is continued at a block 58. At block 58 a test is made with the first detector 49 as to whether a control voltage U1 with a high level H is present at the input 41 of the control apparatus 25. In the event that it is detected at the block 58 that a control voltage U1 with a high level H is present at the input 41, it can only be an external control voltage U1 issued by the other videorecorder 35. This is because it has been detected as a result of the previous test at the block 53 that no "playback" mode of operation is switched on in the videorecorder 1. Thus, it is reliably the case that the stage 39, which generates control voltage U1, does not issue an internal control voltage U1 with a high level H. Therefore, a control voltage U1 with a high level H detected at the block 58 can only originate from the other videorecorder 35.

If during the test at the block 58 it is actually determined that the control voltage U1 with a high level H is present at the input 41, i.e., if this test produces a positive result which constitutes the first item of control information I1, the program cycle is continued at a subsequent block 59. At the block 59, a test is made as to whether a stop condition previously specified by a user has been reached. For example, such a stop condition may exist in that a copy operation is only intended to take place during a specific time period, for example only for the actual playing time of a recording indicated on a cassette with a recording on it. Such a stop condition can also exist in that a copy operation is only intended to take place up to a specific counter state of an internal counter mechanism. If it is determined at the block 59 that a previously specified stop condition has not been achieved, the program cycle is continued at a block 60.

At the block 60, a control signal S is generated which is fed to the output 27 of the control apparatus 25, via which the switching on of the "record" mode of operation for the copying of the image and sound signals fed to the videorecorder 1 takes place. As is clear from the previously described program cycle, in particular from the statements referring to blocks 55 and 58, the block 60 can only be reached if both items of control information I1 and I2 are present simultaneously. In other words, this means that the control apparatus 25 is designed to process the first item of control information I1 and the second item of control information I2 and to switch on the "record" mode of operation in the videorecorder 1 as a function of the simultaneous presence of the first item of control information I1 and of the second item of control information I1.

After the block 60, the program cycle is continued again at the block 58. As long as it is determined at the block 58 that the control voltage U1 with a high level H is present at the input 41 of the control apparatus 25, i.e., the "playback" mode of operation is switched on in the other videorecorder 35, and a specified stop condition has not yet been reached, which is constantly tested at the block 59, the "record" mode of operation switched on at the block 60 remains switched on in the videorecorder 1 so that the image and sound signals played back by the other videorecorder 35 are recorded, i.e., copied, by the videorecorder 1.

If it is determined at the block 58 that a control voltage U1 with a high level H is no longer present at the input 41, i.e., the "playback" mode of operation has been switched off in the other videorecorder 35, the first item of control information I1 is eliminated, and the program cycle of FIG. 2 continues at a block 61 rather than at block 59. At the block 61, the generation of the control signal S is terminated, and consequently the "record" mode of operation in the videorecorder 1 is switched off. Thus, at exactly the same time as the "playback" mode of operation is switched off in the other videorecorder 35, the "record" mode of operation is switched off in the videorecorder 1. Afterwards, the program cycle is continued at a block 62.

At the block 62, the flag F set at the block 57 is reset again. This means that the storage, which took place by means of the setting of the flag F at the block 57, of the second item of control information I2 representing the fact that the copy key 46 was actuated, which was tested at the block 55, is now terminated at the block 62 by the resetting of the flag F. After the block 62, at a block 63 the present program cycle is terminated, and the system goes over to processing other program cycles.

Because the flag F at the block 62 is reset, the flag F at the block 57 must be reset again before the "record" mode of operation can be switched on again in the videorecorder 1 at the block 60. In addition, before the block 57 is reached again, a positive test result must be detected at the block 55, which result is only obtained if the copy key 46 is actuated again. What this means is that the control apparatus 25 (which is formed utilizing the microcomputer) is designed to again switch on "record" mode of operation after the "record" mode of operation has been previously switched off at the block 61. This can take place by means of the elimination of the first item of control information I1 (i.e., after switching off of the "playback" mode of operation in the other videorecorder 35) exclusively in the event of the renewed simultaneous presence of both the first item of control information I1, which is received after a renewed switching on of the "playback" mode of operation in the other videorecorder 35, and the second item of control information I2, which is received after a renewed actuation of the copy key 46.

If it is determined at the block 59 that a previously specified stop condition has been reached, i.e., a copy operation is to be terminated although the "playback" mode of operation still remains switched on in the other videorecorder 35, the program cycle is also continues at the block 61, where the "record" mode of operation in the videorecorder 1 is switched off. This switching off takes place even though the other videorecorder 35 continues to emit a control voltage U1 with a high level H. After such a switching off of the "record" mode of operation, the flag F is reset at the block 62 so that a renewed switching on of the "record" mode of operation (in order to carry out a copy operation) is only possible after a renewed actuation of the copy key 46.

With the videorecorder 1 depicted in FIG. 1, it is thus ensured with very simple means that when a copy operation is desired in the videorecorder 1 the "record" mode of operation is switched on at exactly the same time at which the "playback" mode of operation is switched on in the other videorecorder 35 at the start of the copy operation; and, in addition, in the videorecorder 1 the "record" mode of operation is switched off at exactly the same time at which the "playback" mode of operation is switched off in the other videorecorder 35 at the end of this copy operation. Furthermore, with the videorecorder 1 depicted in FIG. 1, it is advantageously ensured with very simple means that after the "playback" mode of operation is switched off in the other videorecorder 35 connected to the videorecorder 1, a renewed switching on of the "record" mode of operation is only possible in the videorecorder 1 after an intentional renewed actuation of the copy key of the videorecorder 1. This has the advantage that after a copy operation is carried out, after which the "playback" mode of operation is switched off in the other videorecorder 35 and the "record" mode of operation is switched off in the videorecorder 1, a recording which is to be subsequently copied can be searched for in the other videorecorder 35 without additional manipulations. This being necessary because it is necessary to switch on a "playback" mode of operation in order to search for this recording in the other videorecorder 35 without the switching on of the "record" mode of operation in the videorecorder 1 being triggered by this switching on of the "playback" mode of operation in the other videorecorder 35. As a result of the fact that a copy key has to be intentionally actuated in order to activate a copy operation, any undesired incorrect copies are also advantageously excluded.

The successive steps in a copying process with the videorecorder 1 depicted in FIG. 1 are described briefly below, another videorecorder 35 being connected to the videorecorder 1 in order to copy over to the videorecorder 1 individual desired sections of a recording from the other videorecorder 35:

1. a free point on the tape is searched for in the videorecorder 1;
2. the "pause" mode of operation or the "stop" mode of operation is switched on in the videorecorder 1;
3. the start of a section of a recording desired for copying is searched for in the other videorecorder 35;
4. the "pause" mode of operation or the "stop" mode of operation is switched on in the other videorecorder 35;
5. the copy key 46 of the videorecorder 1 is actuated;
6. the "playback" mode of operation is switched on in the other videorecorder 35;
7. as a result of the switching on of the "playback" mode of operation in the other videorecorder 35, the "record" mode of operation is switched on automatically and simultaneously in the videorecorder 1 so that copying of the desired section of a recording takes place;
8. the "playback" mode of operation in the other videorecorder 35 is switched off when the end of the section of a recording desired as a copy is reached, the "stop" mode of operation or possibly the "pause" mode of operation being automatically switched on in the other videorecorder 35;

9. as a result of the previous switching off of the "playback" mode of operation in the other videorecorder 35, the "record" mode of operation is automatically switched off in the videorecorder 1, the "stop" mode of operation or possibly the "pause" mode of operation being automatically switched on in the videorecorder 1;

10. the start of the next section of a recording, which it is desired to copy, in the other videorecorder 35 (analogous with Step 3) is searched for; and 11. repetition of the steps from Step 4 onwards.

The invention is not restricted to a device of the previously described design, i.e., to a videorecorder for recording and playing back image and sound signals with magnetic heads which can be driven in rotation, but can also be applied in other devices, for example, in audiomagnetic cassette recorders with stationary magnetic heads which record and play back sound signals in analog or in digital form or in CD players suitable for recording and playing back or even in combination systems which contain such devices. The control voltage which can be detected with the first detector can also be switched over between two low levels and two high levels in a variant with respect to the described exemplary embodiment in order to signal a total of four different operating states, the first detector then generating the first item of control information when the two high levels of the control voltage are present. The two detectors and the logic stage of the exemplary embodiment described above realized using a microcomputer can of course also be made up of discrete components.

I claim:

1. A device for recording information signals on a record carrier, the device comprising:

connection means for connecting a second device capable of supplying the information signals while in a playback mode of operation to the device, said connection means having connection contacts, some of the contacts being provided for receiving the information signals played back by the second device and at least one other of the contacts being provided for receiving a control voltage generated and emitted by the second device, which control voltage is at a first level when the second device is not in its playback mode of operation and at a second level when the second device is in its playback mode of operation;

first detector means for detecting which level the control voltage is at, and generating a first item of control information when the control voltage is at the second level;

second detector means for detecting whether a copy instruction, indicating that the information signals played back by the second device are to be recorded, is given to the first device, and generating a second item of control information when the copy instruction is given; and control means for controlling modes of operation of the first device, such modes including at least a record mode of operation, and processing the first and second items of control information and switching on the record mode of operation when the first and second items of control information are simultaneously being generated.

2. The device as claimed in claim 1, wherein said control means is further adapted to switch off the record mode of operation after it has been switched on when either the first or second item of control information is no longer generated.

3. The device as claimed in claim 2, wherein said control means is further adapted to switch on the record mode of operation after that mode of operation has previously been switched off exclusively in the event of renewed simultaneous generation of both the first and second items of control information.

4. The device as claimed in claim 1, wherein said control means is further adapted to switch on the record mode of operation after that mode of operation has previously been switched off exclusively in the event of renewed simultaneous generation of both the first and second items of control information.

5. The device as claimed in claim 4, further comprising a manually actuatable key whose actuation causes the copy instruction to be given to the device.

6. The device as claimed in claim 1, further comprising a manually actuatable key whose actuation causes the copy instruction to be given to the device.

7. The device as claimed in claim 1 for recording and playing back information signals on a record carrier, wherein the modes of operation also include a playback mode of operation.

* * * * *